United States Patent [19]

Hirai

[11] Patent Number: 5,293,575
[45] Date of Patent: Mar. 8, 1994

[54] FACSIMILE APPARATUS WITH AUDIO RESPONSE FUNCTION

[75] Inventor: Yuuzi Hirai, Fukuoka, Japan

[73] Assignee: Matsushita Electric Industrial Co., Ltd., Osaka, Japan

[21] Appl. No.: 773,916

[22] PCT Filed: Apr. 1, 1991

[86] PCT No.: PCT/JP90/00430
§ 371 Date: Oct. 3, 1991
§ 102(e) Date: Oct. 3, 1991

[87] PCT Pub. No.: WO91/15915
PCT Pub. Date: Oct. 17, 1991

[30] Foreign Application Priority Data

Apr. 5, 1990 [JP] Japan .................................. 2-90841

[51] Int. Cl.$^5$ ...................... H04M 1/64; H04M 11/00
[52] U.S. Cl. ...................................... 379/100; 379/67; 379/88
[58] Field of Search ...................... 379/96, 97, 98, 100, 379/67, 87, 88, , 351, 44

[56] References Cited

U.S. PATENT DOCUMENTS

| | | | |
|---|---|---|---|
| 4,794,637 | 12/1988 | Hashimoto | 379/100 |
| 4,800,439 | 1/1989 | Yoshino | 379/100 |
| 4,868,865 | 9/1989 | Ogawa et al. | 379/100 |
| 4,932,022 | 6/1990 | Keeney et al. | 379/165 |
| 5,029,198 | 7/1991 | Walpole et al. | 379/88 |
| 5,131,026 | 7/1992 | Park | 379/100 |

FOREIGN PATENT DOCUMENTS 60-241367 11/1985 Japan .
1-22160 1/1989 Japan .
1-24556 1/1989 Japan .
1-290359 11/1989 Japan .

Primary Examiner—Wing F. Chan
Assistant Examiner—Jason Chan
Attorney, Agent, or Firm—Lowe, Price, LeBlanc & Becker

[57] ABSTRACT

A facsimile apparatus with an audio response function according to this invention includes an interface for closing a telephone line in response to detection of a ring signal, a response message transmitting device for transmitting a response message after the interface closes the telephone line, a communication start signal detecting device for detecting a facsimile communication start signal inputted from the telephone line, a facsimile communication device for performing facsimile communication, and a change circuit for connecting the telephone line to the facsimile communication device when the communication start signal detecting device detects the facsimile communication start signal in the case where the response message transmitting device transmits the response message. According to this structure, when the ring signal is inputted from the telephone line, the interface closes the telephone line and the response message transmitting device transmits the response message. In addition, when the facsimile communication start signal is inputted from the telephone line, this is detected by the communication start signal detecting device and the change circuit connects the telephone line to the facsimile communication device.

2 Claims, 7 Drawing Sheets

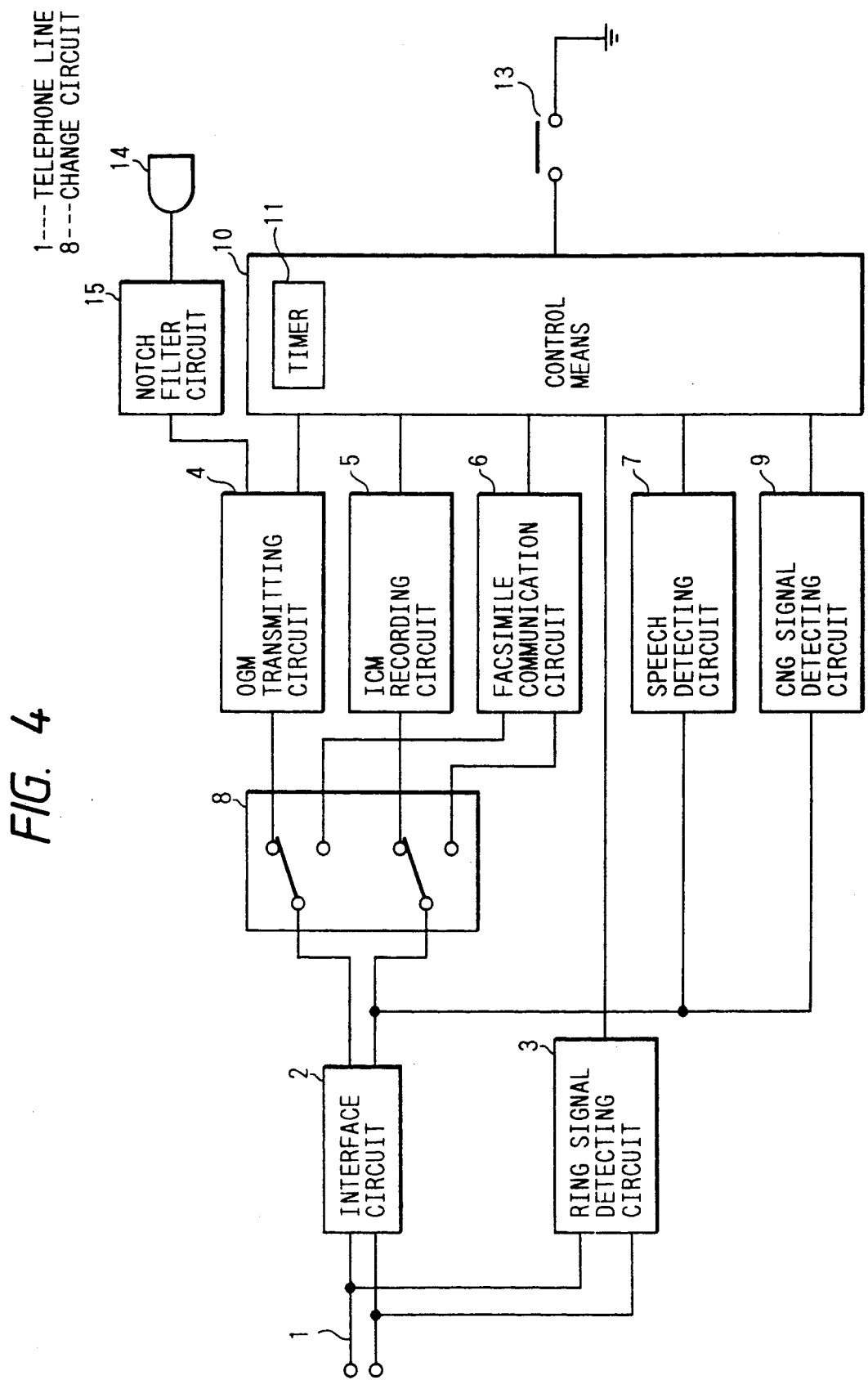

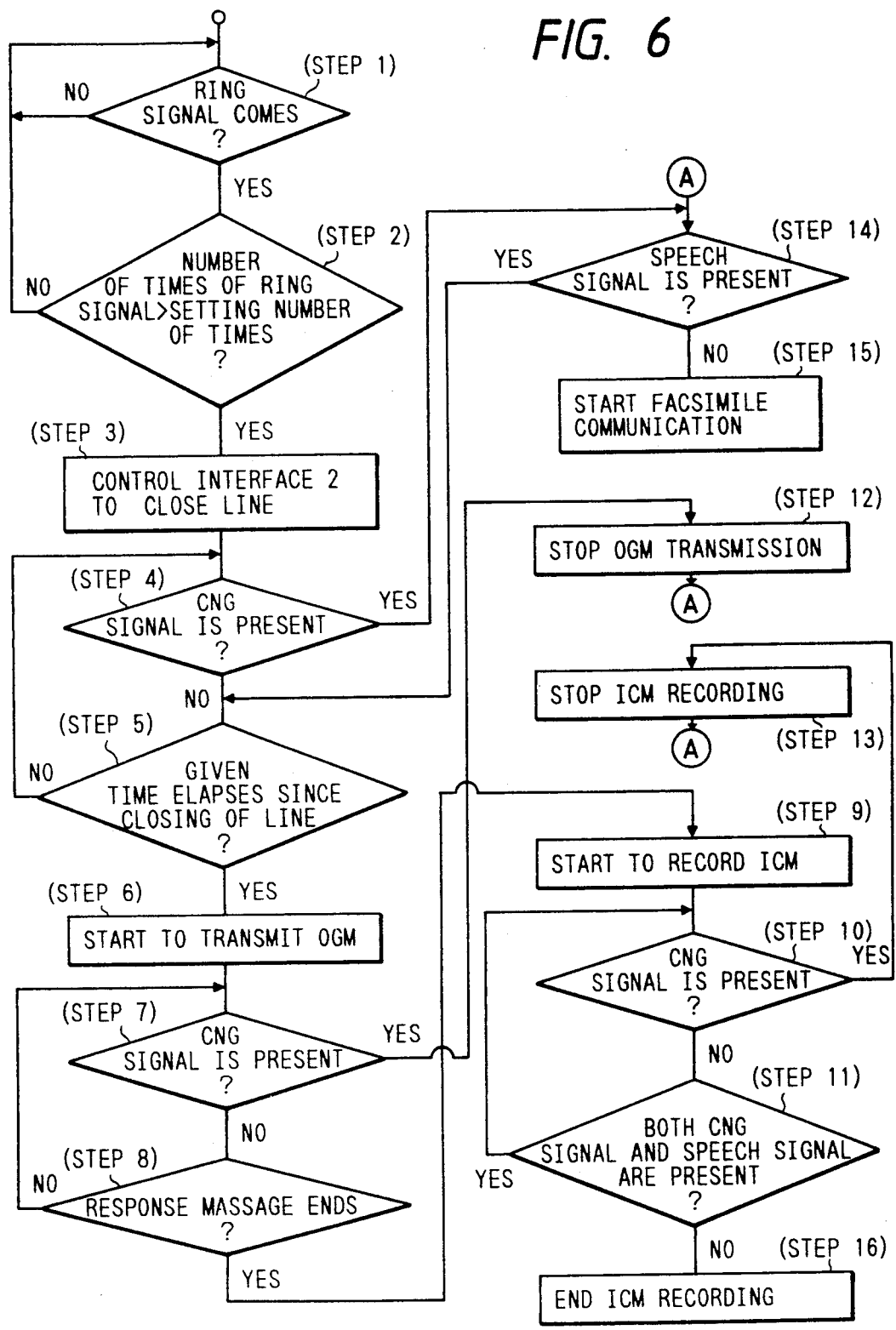

FACSIMILE APPARATUS WITH AUDIO RESPONSE FUNCTION

TECHNICAL FIELD

This invention relates to a facsimile apparatus with an audio response function which responds to a calling side by a speech before facsimile communication.

BACKGROUND ART

A facsimile apparatus with an audio response function has been used heretofore. This has the following design. When a ring signal is inputted from a telephone line, the telephone line is automatically closed and a response message (referred to as an OGM hereinafter) is transmitted. Then, it changes to the operation of receiving facsimile information. In another case, after an OGM is transmitted, it changes to the operation of recording a speech if the signal inputted from the telephone line is the speech (referred to as the ICM hereinafter). It changes to the facsimile operation if the signal inputted from the telephone line is a facsimile communication start signal (referred to as a CNG signal hereinafter) or is soundless.

A prior art facsimile apparatus with an audio response function, which is such as mentioned above, will be described hereinafter with reference to drawings.

FIG. 7 is a block diagram showing the structure of a prior art facsimile apparatus with an audio response function. FIG. 8 is a flowchart showing its operation. In FIG. 7, 1 is a telephone line, and 2 is an interface circuit connected to the telephone line 1. The numeral 3 is a ring signal detecting circuit for detecting a ring signal coming from the telephone line 1. The numeral 4 is an OGM transmitting circuit 5 such as a tape recorder, 5 is an ICM recording circuit such as a tape recorder, 6 is a facsimile communication circuit, 7 is a speech signal detecting circuit, and 8 is a change circuit. The numeral 9 is a CNG signal detecting circuit for detecting a CNG signal coming from the telephone line 1, and 10 is a control means composed of a microcomputer. The numeral 11 is a timer provided in the control means 10.

Hereinafter, a description will be given of the operation of the facsimile apparatus with the audio response function which is designed as above.

When a ring signal is inputted from the telephone line 1, the ring signal detecting circuit detects this (a step 1) and outputs it to the control means 10. The control means 10 controls the interface circuit 2, closing the telephone line 1 (a step 2). Next, the control means 10 controls the OGM transmitting circuit 4, outputting an OGM to the telephone line 1 (a step 3). When the control means 10 detects an end of the transmission of the OGM (a step 4), it controls the ICM recording circuit 5 to record the signal inputted from the telephone line 1 (a step 5) and operates the timer 11 (a step 6). With respect to the end of the transmission of the OGM, in the case where a medium into which the OGM is recorded is a tape, a beep sound is recorded into a position of the end of the recording of the OGM, and the OGM is ended when the beep sound is detected. In the case where a medium is an IC, there are known methods such as a method in which an address occurring at an end of the recording of the OGM is detected, and the OGM is ended at this address position. A description of the details thereof will be omitted.

Simultaneously with the recording of the ICM, the control means 10 enables the speech signal detecting circuit 7 and the CNG signal detecting circuit 9 to monitor a signal inputted from the telephone line. In the case where the signal inputted from the telephone line 1 is a speech (a step 7), it keeps the operation of recording the ICM as it is. In the case where the signal inputted from the telephone line is a CNG signal (a step 9), the control means 10 changes the change circuit 8 to the facsimile communication circuit 6 (a step 10). In the case where both the above-mentioned signals are not detected, a decision is made as to whether or not the count of the timer 11 is completed (a step 11). When it is not completed, the return to the step 7 occurs. When it is completed, the control means 10 changes the change circuit 8 to the facsimile communication circuit 6 (the step 10).

However, in a structure such as mentioned above, in the case where a CNG signal is inputted from a calling side during the transmission of an OGM, if a signal similar to the CNG signal is accidentally recorded in the OGM, there is a chance that a signal which results from a return of a self-outputted OGM of the OGM via the telephone line is erroneously detected as a CNG signal. Therefore, during the transmission of the OGM, the detection of the CNG signal is not executed. Accordingly, there is a problem that facsimile communication can not be done during the transmission of the OGM. Thus, in the case where the length of the OGM is supposed to be one minute, there is a problem that facsimile communication is not done during one minute after a call incoming.

In the case of a facsimile apparatus, standards prescribe that a calling side should open a telephone line if a time from the moment of the closing of the telephone line by the calling side to the moment of the reception of a signal of a receiving side is equal to or longer than a given time. Thus, there is a problem that facsimile communication can not be done if the OGM is long.

DISCLOSURE OF THE INVENTION

This invention was carried out in view of the above-mentioned prior art, and is to provide a facsimile apparatus with an audio response function which, in the case where a CNG signal is inputted during the transmission of an OGM, can detect this and immediately start facsimile communication.

BRIEF DESCRIPTION OF THE DRAWINGS

FIG. 4 is a block diagram showing the structure of a facsimile apparatus with an audio response function according to a second embodiment of this invention;

FIG. 6 is a flowchart of a facsimile apparatus with an audio response function according to an embodiment of this invention;

BEST MODES FOR CARRYING OUT THE INVENTION

An embodiment of this invention will be described hereinafter with reference to drawings.

Figure 1:
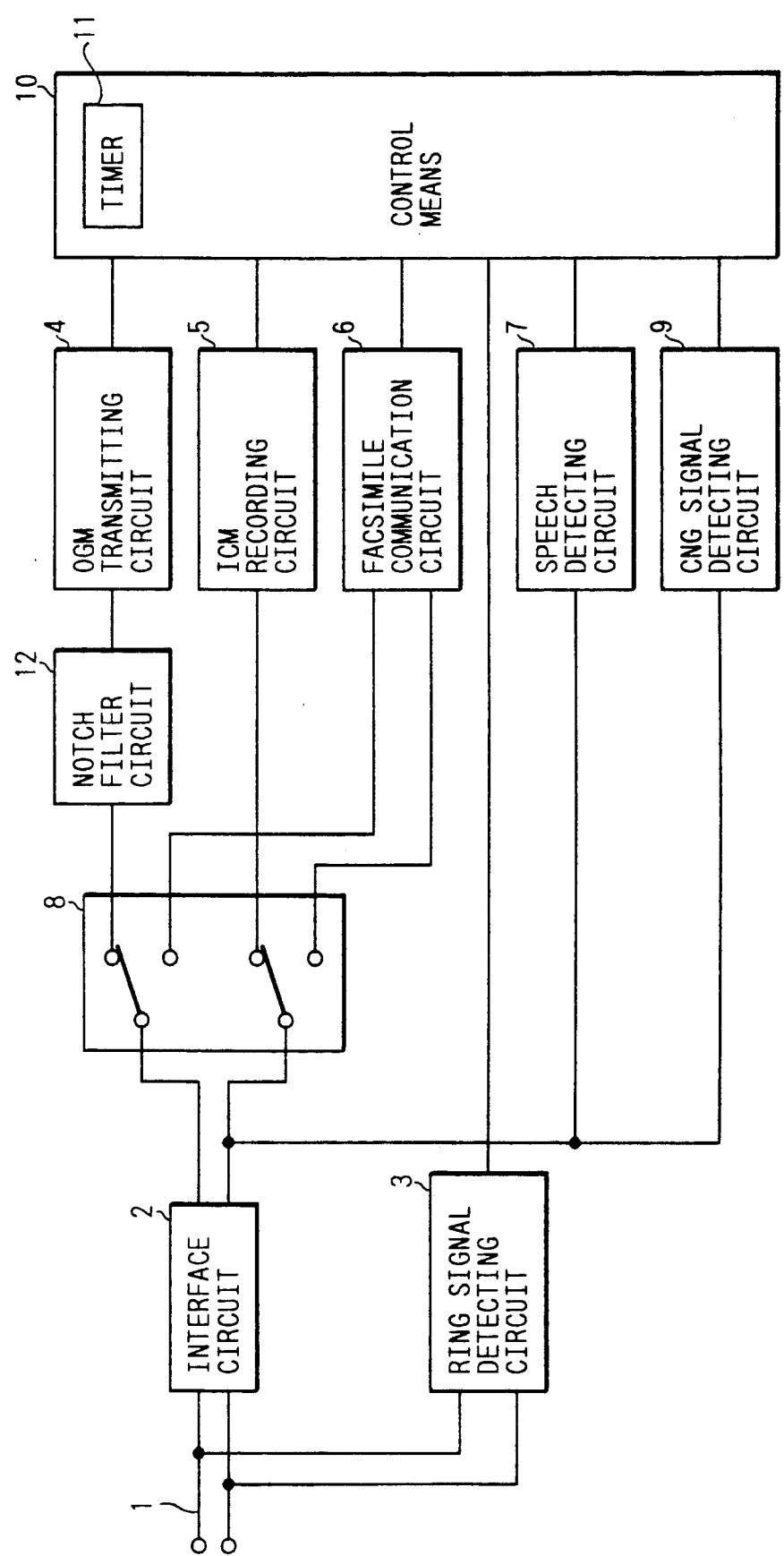
FIG. 1 is a block diagram showing the structure of a facsimile apparatus with an audio response function according to an embodiment of this invention.
Figure 2:
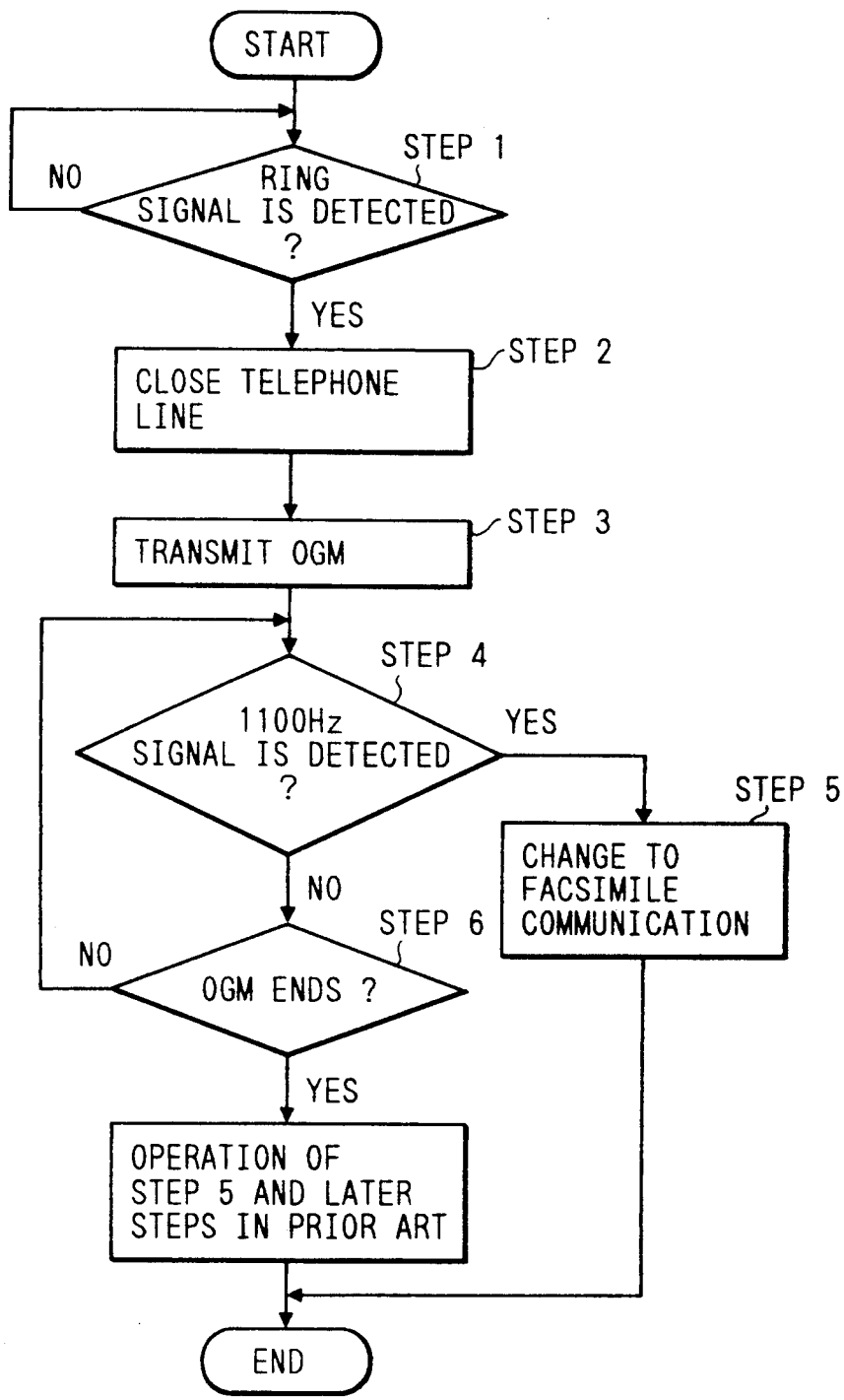
FIG. 2 is a flowchart showing its operation.
Figure 3:
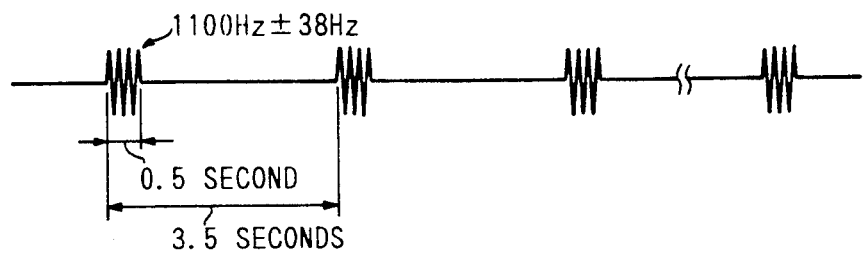
FIG. 3 is a view of the waveform of a CNG signal.

FIG. 1 is a block diagram showing the structure of a facsimile apparatus with an audio response function according to an embodiment of this invention. FIG. 2 is a flowchart showing its operation, and FIG. 3 is a view showing the waveform of a CNG signal. In FIG. 1, 12 is a notch filter circuit for removing a signal in a band centered at 1100 Hz ±38 SHz. Parts similar to the prior art example are denoted by the same numbers, and the description thereof will be omitted.

Hereinafter, a description will be given of the operation of the facsimile apparatus with the audio response function which is designed as above.

Firstly, a CNG signal will be explained. As shown in FIG. 3, the CNG signal is that a signal of 1100 Hz ±38 Hz for 0.5 second is repeatedly transmitted at a period of 3.5 seconds. In general, this signal is continued for a given time until facsimile communication between a calling side and a receiving side starts or until the previously-mentioned calling side opens a telephone line.

Next, the operation will be explained. When a ring signal is inputted from a telephone line 1, a ring signal detecting circuit 3 detects this (a step 1) and outputs it to a control means 10. The control means 10 controls an interface circuit 2, closing the telephone line 1 (a step 2). Next, the control means 10 controls an OGM transmitting circuit 4, outputting an OGM to the telephone line 1 (a step 3). Simultaneously, a CNG signal detecting circuit 9 is made to monitor a signal inputted from the telephone line 1. Here, the CNG signal detecting circuit 9 is composed of a band pass filter of 1100 Hz ±38 Hz and a timer circuit. When a signal of 1100 Hz ±38 Hz is detected, the timer circuit is started and a detection is made as to whether or not the signal of 1100 Hz continues for 0.5 second. Since the OGM passes through the notch filter circuit 12, it becomes an OGM which lacks a signal of frequency components of 1100 Hz ±38 Hz. Therefore, even if a signal which results from a feedback of the transmitted OGM is inputted into the CNG signal detecting circuit 9, an erroneous detection is prevented. Under these conditions, when a CNG signal is inputted from the telephone line 1, the CNG signal detecting circuit 9 detects this and the CNG signal detecting circuit 9 outputs a CNG signal detection signal to the control means 10 (a step 4). When the control means 10 receives this signal, it changes a change circuit 8 to a facsimile communication circuit 6 side so that the facsimile communication circuit 6 can communicate with the telephone line 1 (a step 5).

In the case where a CNG signal is not detected during the transmission of the OGM (a step 6), an operation similar to the prior art example is done. Firstly, an ICM recording circuit 5 is operated. In the case where the signal inputted from the telephone line 1 is a speech (a step 7), the recording of the speech signal is continued as it is. In the case where a CNG signal is inputted after the transmission of the OGM or in the case where a soundless state continues for a given time, facsimile communication is started.

While the change to the facsimile communication is immediately done upon the first detection of a signal of 1100 Hz ±38 Hz in this embodiment, a more accurate change to the facsimile can be realized provided that the change is done in the case where the detection occurs two or three consecutive times.

Other Embodiments

Another embodiment of this invention will be described hereinafter with reference to drawings.

FIG. 4 shows the structure of a facsimile apparatus with an audio response function according to a second embodiment of this invention. In FIG. 4:13 is an OGM recording instruction switch; 14 is a microphone; and 15 is a notch filter circuit for removing a signal of 1100 Hz ±38 Hz. Parts similar to the prior art example and the above-mentioned first embodiment are denoted by the same numbers, and a description thereof will be omitted.

Hereinafter, a description will be given of the operation of the facsimile apparatus with the audio response function which is designed as above.

When the recording of an OGM is instructed by the OGM recording instruction switch 13, a control means 10 makes an OGM transmitting means in a recording state. In this state, when an OGM is inputted, it is converted by the microphone 14 into an electric signal and a signal outputted from the microphone 14 is inputted into the notch filter circuit 15. After a signal of frequency components of 1100 Hz ±38 Hz of a CNG signal is removed by the notch filter circuit 15, it is outputted to the OGM transmitting means and is recorded.

Under this condition, when a ring signal is inputted from a telephone line 1, facsimile communication operation is done upon the detection of a CNG signal similarly to the first embodiment.

Figure 5:
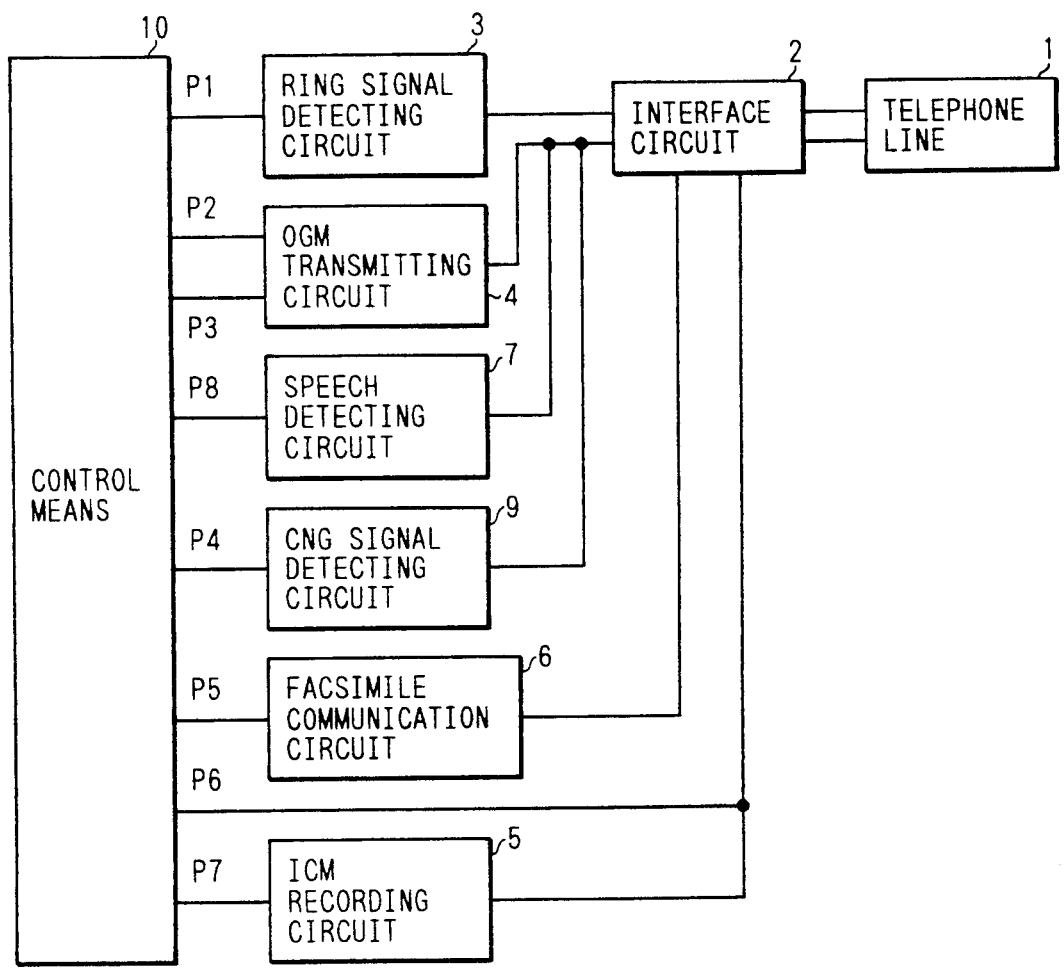
FIG. 5 is a block diagram of a facsimile apparatus with an audio response function according to an embodiment of this invention.
Figure 7:
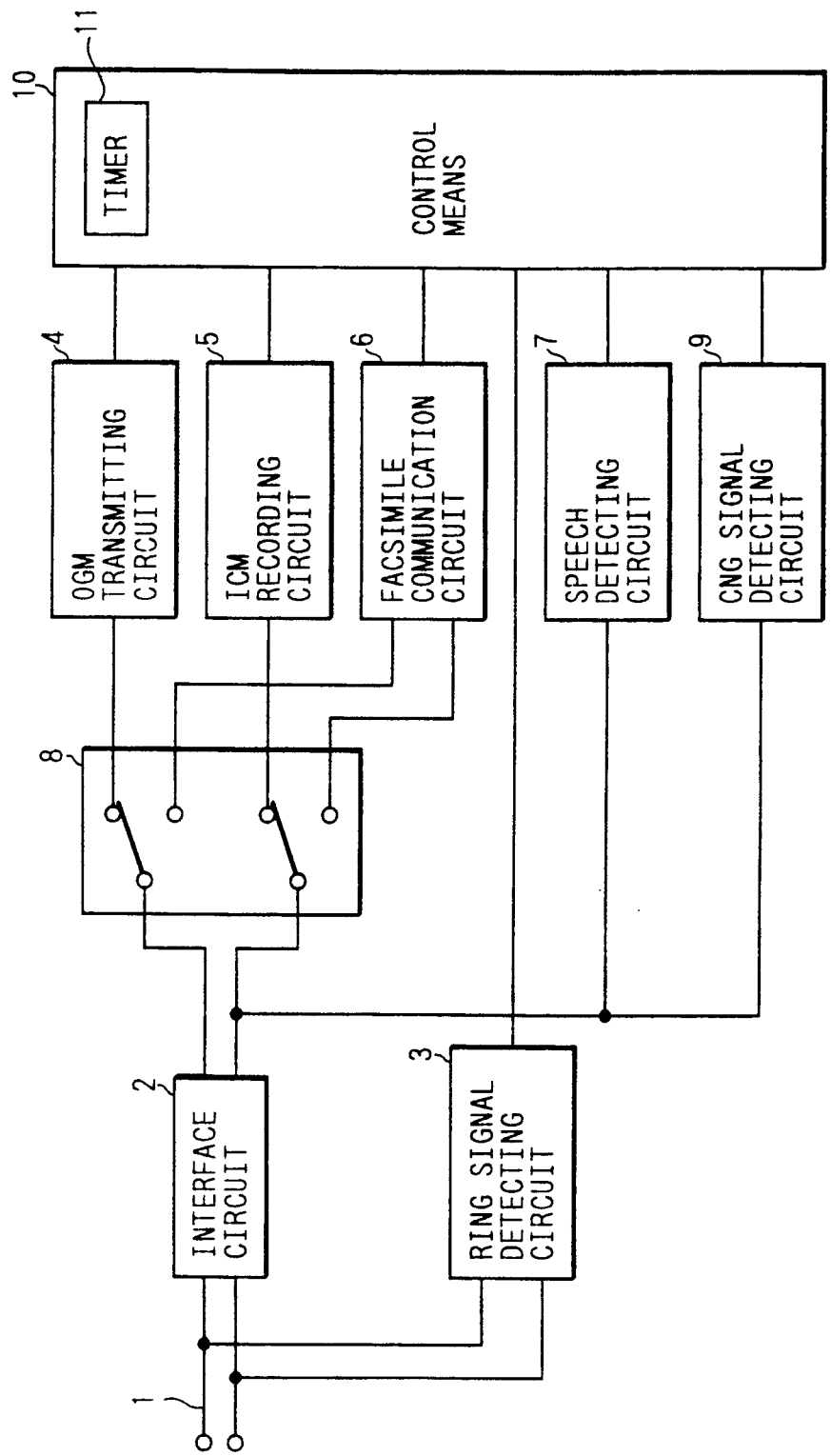
FIG. 7 is a block diagram showing the structure of a prior art facsimile apparatus with an audio response function.
Figure 8:
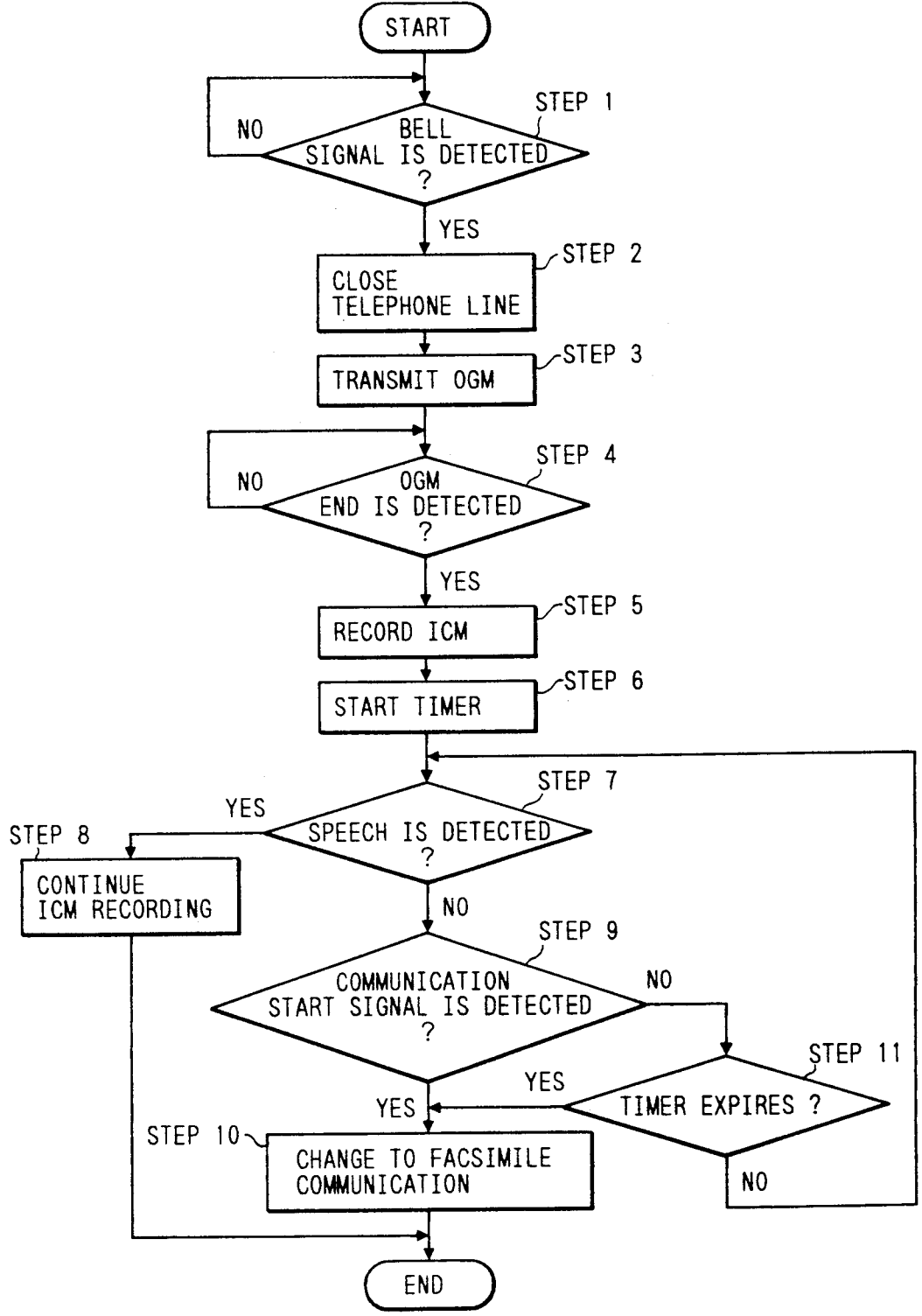
FIG. 8 is a flowchart showing its operation.

FIG. 5 is a block diagram of a facsimile apparatus with an audio response function according to an embodiment of this invention.

In FIG. 5:4 is an OGM transmitting means; 9 is a CNG signal detecting means; 2 is an interface circuit; 6 is a facsimile communication circuit; 1 is a telephone line; 3 is a ring signal detecting means; and 5 is an ICM recording circuit. These are similar to the structure of the prior art example, and a detailed description thereof will be omitted. The numeral 7 is a speech detecting means for detecting a speech signal from the telephone line 1, which is composed of a band pass filter transmitting signals of 1100−38 Hz and 1100+38~3400 Hz outside the frequency band of a CNG signal. The numeral 10 is a control means composed of a microcomputer, which receives signals from the speech detecting means 7, the ring signal detecting means 3, a CNG signal detecting circuit 4, and the OGM transmitting means 2, and controls the OGM transmitting means 4, the interface circuit 2, the facsimile communication circuit 6, and the ICM recording circuit 5.

Hereinafter, with reference to the flowchart of FIG. 6, a description will be given of the operation of the facsimile apparatus with the audio response function according to this invention which is designed as above.

When a call incoming signal comes from the telephone line 1 (a step 1), the call incoming signal is inputted into an input terminal P1 of the control means 10 via the ring signal detecting circuit 3. The control means 10 counts the ring signal. When the call incoming signal has come a predetermined number of times (a step 2), it controls the interface circuit 2 via the output terminal 6 and closes the line (a step 3). When the line is closed at the step 3, a speech signal or a CNG signal is transmitted via the telephone line 1. In order to decide whether or not this signal is a CNG signal, the control means 10 monitors an input terminal P4 into which a CNG detection signal is inputted from the CNG signal detecting circuit 9. (A step 4). Monitoring the input terminal P4 is continued for a given time after the line is closed at the step 3 (a step 5). The CNG signal detecting circuit 9 uses a band pass filter in the detection of the CNG signal, the band pass filter transmitting frequencies of 1100 ±38 Hz. The CNG signal which comes from the telephone line 1 passes through the band pass filter of the CNG signal detecting circuit 9 and enters the input terminal P4 of a control section 1.

When the CNG detection signal from the CNG signal detecting circuit 9 enters the input terminal P4 of the control means 10 at the step 4, the control means 10 continues to monitor the detection signal from the CNG signal detecting circuit 9 which enters the input terminal P4, and simultaneously monitors an input terminal P8 into which a detection signal from the speech detecting circuit 7 for detecting a frequency band outside the CNG signal is inputted (a step 14). In the case where the CNG signal inputted into the input terminal P4 continues to be measured for a given time at the step 14 and the speech signal detection signal inputted into the input terminal P8 continues to be not measured for a given time, the control means 10 judges this call to be from a facsimile, and controls the facsimile communication circuit 6 via an output terminal P5 to start the communication of facsimile (a step 15). On the other hand, in the case where the CNG signal inputted into the input terminal P4 continues to be not measured for the given time at the step 14 or in the case where the speech signal detection signal continues to be measured for the given time, the control means 10 returns the operation to the step 5.

Next, in the case where the line is closed at the step 3 and the CNG detection signal from the CNG signal detecting circuit 9 is not inputted into the terminal P4 of the given time control means 10 at the steps 4 and 5, the control means 10 starts the OGM transmitting circuit 4 via the output terminal P2 to start the transmission of an OGM to the telephone line 1 (a step 6). The control means 10 continues to monitor the input terminal P4 into which the CNG detection signal from the CNG signal detecting circuit 9 is inputted (a step 7).

In the case where the CNG detection signal from the CNG signal detecting circuit 9 which is inputted into the input terminal P4 continues to be measured for a given time, the control means 10 stops the operation of the OGM transmitting circuit 4 via the output terminal P2 (a step 12) and moves the operation to the step 14. On the other hand, in the case where the CNG detection signal from the CNG signal detecting circuit 9 is not inputted into the input terminal P4 and a response message by the OGM transmitting circuit 4 ends so that a message transmission end signal from the OGM transmitting circuit 4 is inputted into an input terminal P3 (a step 8), the control means 10 starts and activates the 1 cm recording circuit 5 via the output terminal P7 to start the recording of a matter from the other party (a step 9).

During the recording of the matter from the other party, the control means 10 continues to monitor the input terminals P4 and P8. In the case where the CNG signal inputted into the input terminal P4 continues to be measured for a given time and the speech signal detection signal inputted into the input terminal P8 continues to be not measured for a given time (a step 10), the control means 10 stops the operation of the 1 cm recording circuit 5 via the output terminal P7 (a step 13) and moves the operation to the step 14. On the other hand, in the case where the CNG signal inputted into the input terminal P4 and the speech detection signal inputted into the input terminal P8 continue to be not measured for a given time at the step 10 (a step 11), the operation of the 1 cm recording circuit 5 is ended (a step 16).

While a matter is recorded in the case where a call is not facsimile in this embodiment, a bell of a telephone may be rung in place of the recording of the matter to inform the user that the call comes from a person.

POSSIBILITY OF INDUSTRIAL UTILIZATION

As above, according to this invention, a CNG signal can be detected and a change to facsimile communication can be done even during the transmission of an OGM by an interface means for closing a telephone line in response to a signal outputted from a ring signal detecting means when a ring signal is inputted from a telephone line, a response message means for transmitting a response message after the interface means closes the telephone line, a communication start signal detecting means for detecting a facsimile communication start signal inputted from the telephone line, a facsimile communication means for performing facsimile communication, and a change circuit for connecting the telephone line to the facsimile communication means when the communication start signal detecting means detects the facsimile communication start signal during the transmission of the response message by the response message transmitting means.

I claim:
1. A facsimile apparatus comprising:
  a response message transmitting means for reproducing and transmitting a recorded response message;
  a communication start signal detecting means for detecting a signal of a first frequency band corresponding to an image communication start signal;
  a facsimile communication means for performing facsimile communication;
  a speech signal detecting means for detecting a second signal of a second frequency band outside the first frequency band;
  a first control means for suspending operation of the response message transmitting means in response to an output signal from the communication start signal detecting means; and
  a second control means for starting the facsimile communication means in the case where the communication start signal detecting means detects a signal of the first frequency band and the speech signal detecting means continues to detect an absence of the second signal for a given time.

2. The facsimile apparatus of claim 1, further comprising a removing means connected between the response message transmitting means and a telephone line for removing frequency components corresponding to the image communication start signal.

* * * * *